(12) United States Patent
Chen

(10) Patent No.: US 7,789,798 B2
(45) Date of Patent: Sep. 7, 2010

(54) TRANSMISSION UPSHIFT CONTROL METHOD

(75) Inventor: Gang Chen, Rochester Hills, MI (US)

(73) Assignee: Chrysler Group LLC, Auburn Hills, MI (US)

(*) Notice: Subject to any disclaimer, the term of this patent is extended or adjusted under 35 U.S.C. 154(b) by 644 days.

(21) Appl. No.: 11/535,594

(22) Filed: Sep. 27, 2006

(65) Prior Publication Data

US 2008/0076634 A1    Mar. 27, 2008

(51) Int. Cl.
*F16H 61/26* (2006.01)
(52) U.S. Cl. ............... 477/156; 477/143; 701/60
(58) Field of Classification Search ......... 477/115–117, 477/143, 156; 701/60
See application file for complete search history.

(56) References Cited

U.S. PATENT DOCUMENTS

| | | | |
|---|---|---|---|
| 4,481,836 A | 11/1984 | Richards | |
| 4,969,098 A | 11/1990 | Leising et al. | |
| 5,642,283 A | 6/1997 | Schulz et al. | |
| 5,809,442 A | 9/1998 | Schulz et al. | |
| 5,835,875 A | 11/1998 | Kirchhoffer et al. | |
| 5,925,086 A * | 7/1999 | Sakai et al. | 701/66 |
| 6,200,242 B1 | 3/2001 | Coffey | |
| 6,292,731 B1 | 9/2001 | Kirchhoffer et al. | |
| 6,301,538 B1 | 10/2001 | Kirchhoffer et al. | |
| 6,370,463 B1 | 4/2002 | Fuji et al. | |
| 6,577,939 B1 | 6/2003 | Keyse et al. | |
| 6,961,646 B2 | 11/2005 | Soliman et al. | |
| 2005/0096823 A1 * | 5/2005 | Soliman et al. | 701/55 |

* cited by examiner

*Primary Examiner*—David D Le
*Assistant Examiner*—Derek D Knight
(74) *Attorney, Agent, or Firm*—Ralph E. Smith

(57) ABSTRACT

A method of controlling an upshift in a transmission having a main box and a compounder that has at least one gearset and at least one friction element separate from the main box includes initiating an upshift in the main box including application of at least one friction element (e.g. a clutch) in the main box, and releasing a friction element (e.g. a clutch) in the compounder providing a swap shift. The duty cycles of solenoids associated with the releasing and applying elements may be alternately controlled in open loop and closed loop fashion to improve the quality of the shift.

18 Claims, 3 Drawing Sheets

| | | ELEMENTS APPLIED | | | | | | | |
|---|---|---|---|---|---|---|---|---|---|
| GEAR | RATIO | UD | OD | R | 2-4 | L-R | LC | DR | FW |
| 1 | 4.127 | X | | | | X | (X) | | X |
| 2 | 2.842 | X | | | | X | | X | |
| 3 | 2.284 | X | | | X | | | X | X |
| 4[1] | 1.573 | X | | | X | | | X | |
| 4 | 1.452 | X | X | | | | | X | X |
| 5 | 1.000 | X | X | | | | | X | |
| 6 | 0.689 | | X | | X | | | X | |
| R | 3.215 | | | X | | X | X | | |

TRANSMISSION UPSHIFT CONTROL METHOD

FIELD OF THE INVENTION

This invention relates generally to vehicle transmissions and more particularly to a method for controlling an upshift in a transmission.

BACKGROUND OF THE INVENTION

An automatic transmission typically includes an electronically controlled hydraulic system. In such an electro-hydraulic system, hydraulically actuated clutches are actuated to couple and decouple gearsets for changing gear ratios of the transmission. Also, a transmission pump supplies pressurized hydraulic fluid from a fluid sump to the clutches through fluid passages. Further, solenoid actuated valves are placed in fluid communication with the fluid passages upstream of the clutches. Finally, a controller receives vehicle input signals, processes the input signals with shift control algorithms to produce solenoid control output signals, and communicates the output signals to the solenoid valves to control flow of fluid to the clutches.

SUMMARY OF THE INVENTION

A method of controlling an upshift in a transmission having a main box and a compounder that has at least one gearset and at least one friction element separate from the main box includes initiating an upshift in the main box including application of at least one friction element (e.g. a clutch) in the main box, and releasing a friction element (e.g. a clutch) in the compounder providing a double swap shift. The duty cycles of solenoids associated with the releasing and applying elements may be alternately controlled in open loop and closed loop fashion to improve the quality of the shift.

One implementation of a method of controlling a double swap upshift in a transmission having a main box and a compounder coupled to the main box, includes:
 initiating an upshift in the main box;
 determining the end of an upshift torque phase in the main box;
 initiating a downshift in the compounder near the end of the upshift torque phase in the main box so that the speed phase of the downshift in the compounder begins after the speed phase of the upshift begins in the main box;
 determining a compounder target speed for the selected gear into which the transmission is being shifted;
 controlling, after the compounder speed is within a threshold value of the compounder target speed, the solenoid duty cycle associated with the clutch being applied to complete the shift.

BRIEF DESCRIPTION OF THE DRAWINGS

The following detailed description of preferred embodiments and best mode will be set forth with regard to the accompanying drawings in which.

DETAILED DESCRIPTION OF PREFERRED EMBODIMENTS

Figures 1, 2:
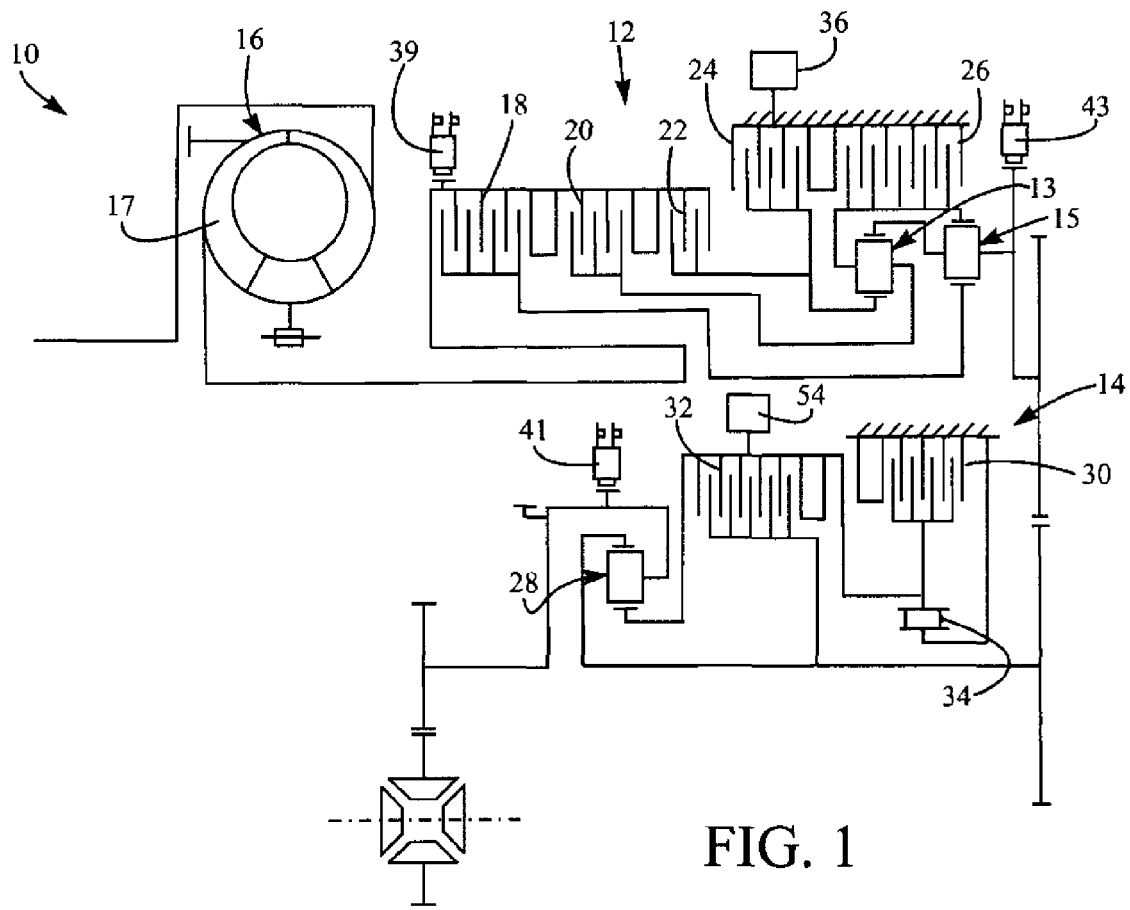
FIG. 1 is a schematic view of one implementation of a transmission.
FIG. 2 is chart illustrating clutches applied in the transmission of FIG. 1 in the various gears of the transmission.

Referring in more detail to the drawings, FIG. 1 illustrates a six-speed transmission 10 that includes a main gear box 12 and a compounder 14 arranged in series. In one implementation, the main gear box 12 is disposed between a torque converter 16 having a turbine diagrammatically illustrated at 17, and the compounder 14. The main gear box 12 may include gearsets 13, 15 and various friction elements, which in one implementation may include clutches such as an underdrive (UD) clutch 18, overdrive (OD) clutch 20, reverse clutch (R) 22, 2-4 clutch 24, and a low-reverse (L-R) clutch 26, and associated gear sets. By themselves, the clutches and gearsets of the main box 12 provide a 4-speed transmission assembly that may be generally of the type set forth in U.S. Pat. No. 4,969,098, the disclosure of which is incorporated herein by reference in its entirety. The compounder 14 may include one additional gear set 28, and associated friction elements such as a LC clutch 30 and a DR clutch 32 with an over-running or freewheel clutch 34. The freewheel clutch 34 automatically releases or is not engaged when the DR clutch 32 is applied, and when the DR clutch 32 is not applied, the freewheel clutch 34 automatically engages, as is known in the art. With the addition of the compounder 14, six speed transmission operation can be obtained with double swap shifts. The general construction and arrangement of the transmission 10 is set forth in U.S. Publication No. 2006/0142106, Published Jun. 29, 2006, and this reference is incorporated herein by reference in its entirety, although the double swap upshift control methodology is set forth herein.

To accomplish six speed transmission operation, a so-called double swap shift is performed to shift the transmission 10 between $2^{nd}$ and $3^{rd}$ gears. In general terms, during the double swap shift an upshift is initiated in the main box 12 and near the end of a torque phase of that upshift a downshift is initiated in the compounder 14. More specifically, to shift from $2^{nd}$ to $3^{rd}$ gear in this implementation of the transmission 10, the L-R clutch 26 is released and the 2-4 clutch 24 is applied in the main box 12, and near the end of the torque phase of the upshift in the main box, the DR clutch 32 is released and the freewheel clutch 34 is automatically grounded. Careful control of this swapshift permits it to be performed smoothly with minimal power loss, bump, or other feedback noticeable by the occupants of the vehicle.

The solenoids that control application or release of the clutches preferably are, but are not limited to, pulse width modulated (PWM) solenoids and hence, the filling and venting of fluid chambers associated with the solenoids are controlled by controlling the duty cycle of the solenoids. The instantaneous duty cycle of a given solenoid may be provided, communicated or otherwise obtained from a table, list or other source of stored data, or it may be a function of closed loop feedback control from various sensors, a combination of both in a given shift sequence or sequences, or otherwise chosen, determined or selected. The duty cycle at any given time during a shift may be controlled to achieve a certain target or selected volume of fluid in the clutch, which may be related to the pressure and/or torque capacity of the clutch. Such target volume based torque phase control during an upshift is disclosed in U.S. patent application Ser. No. 11/222, 066 which was filed on Sep. 8, 2005, and which is incorporated by reference herein in its entirety.

The element being released is vented so that the fluid pressure therein is reduced to a minimum that will support the torque hand-off to the element being applied. The apply rate for the element being applied is controlled to develop the torque needed to begin the speed change phase just as the release element net-apply-pressure reaches zero. This provides a matched exchange that reduces resistance or fight between the release and apply elements and provides a relatively smooth shift. Once the speed change begins the apply element pressure may be controlled to provide desired acceleration of a torque converter turbine.

Figure 3:
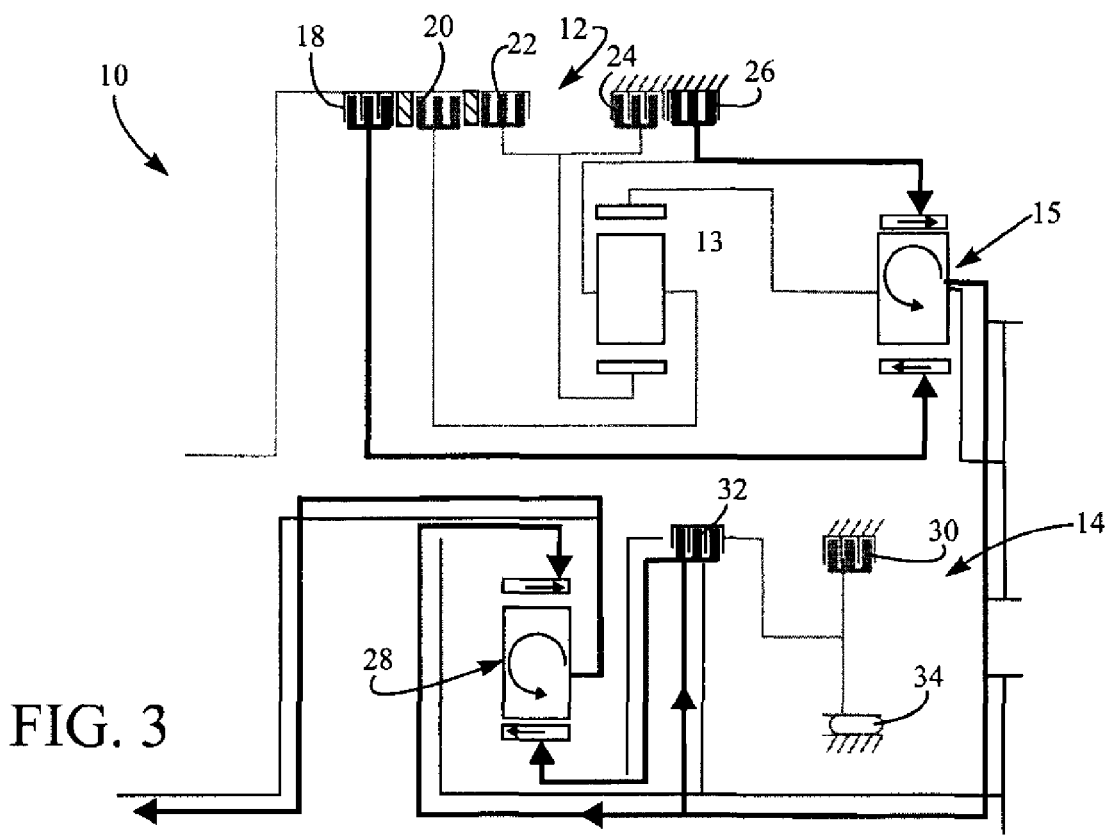
FIG. 3 is a schematic view showing the torque flow in the transmission of FIG. 1 when it is in second gear.
Figure 4:
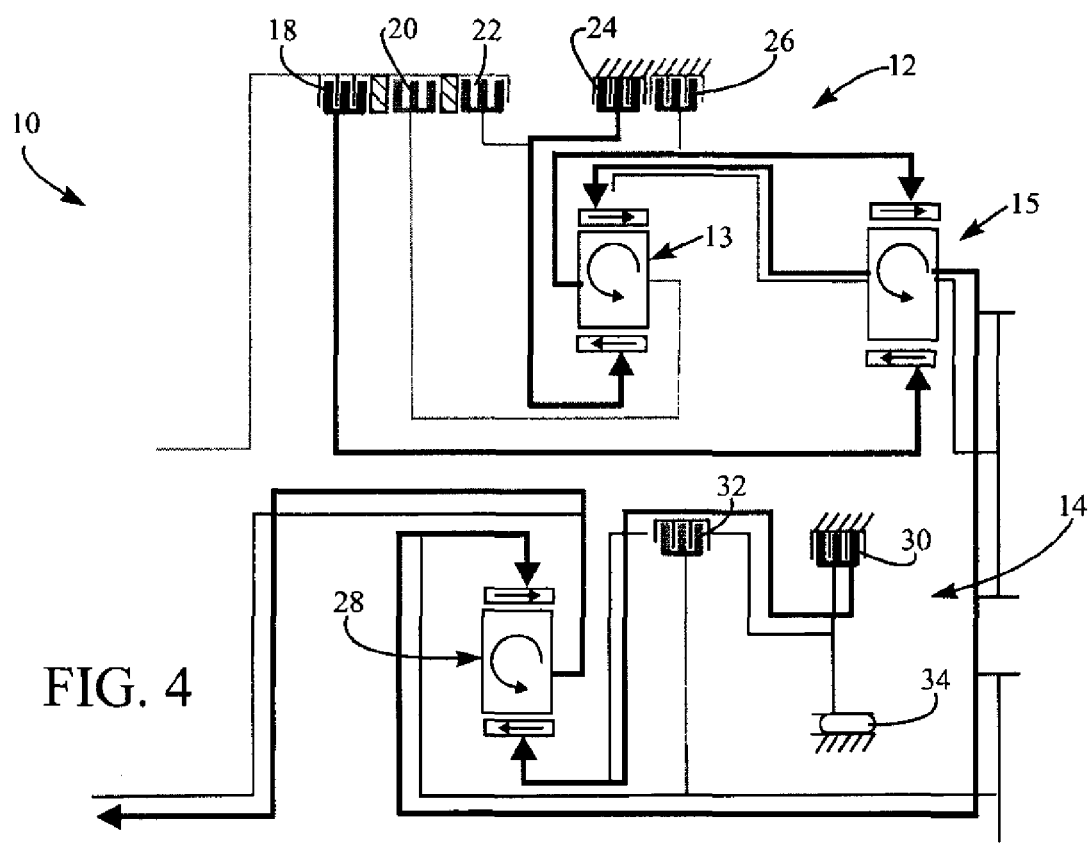
FIG. 4 is a schematic view showing the torque flow in the transmission of FIG. 1 when it is in third gear.
Figure 5:
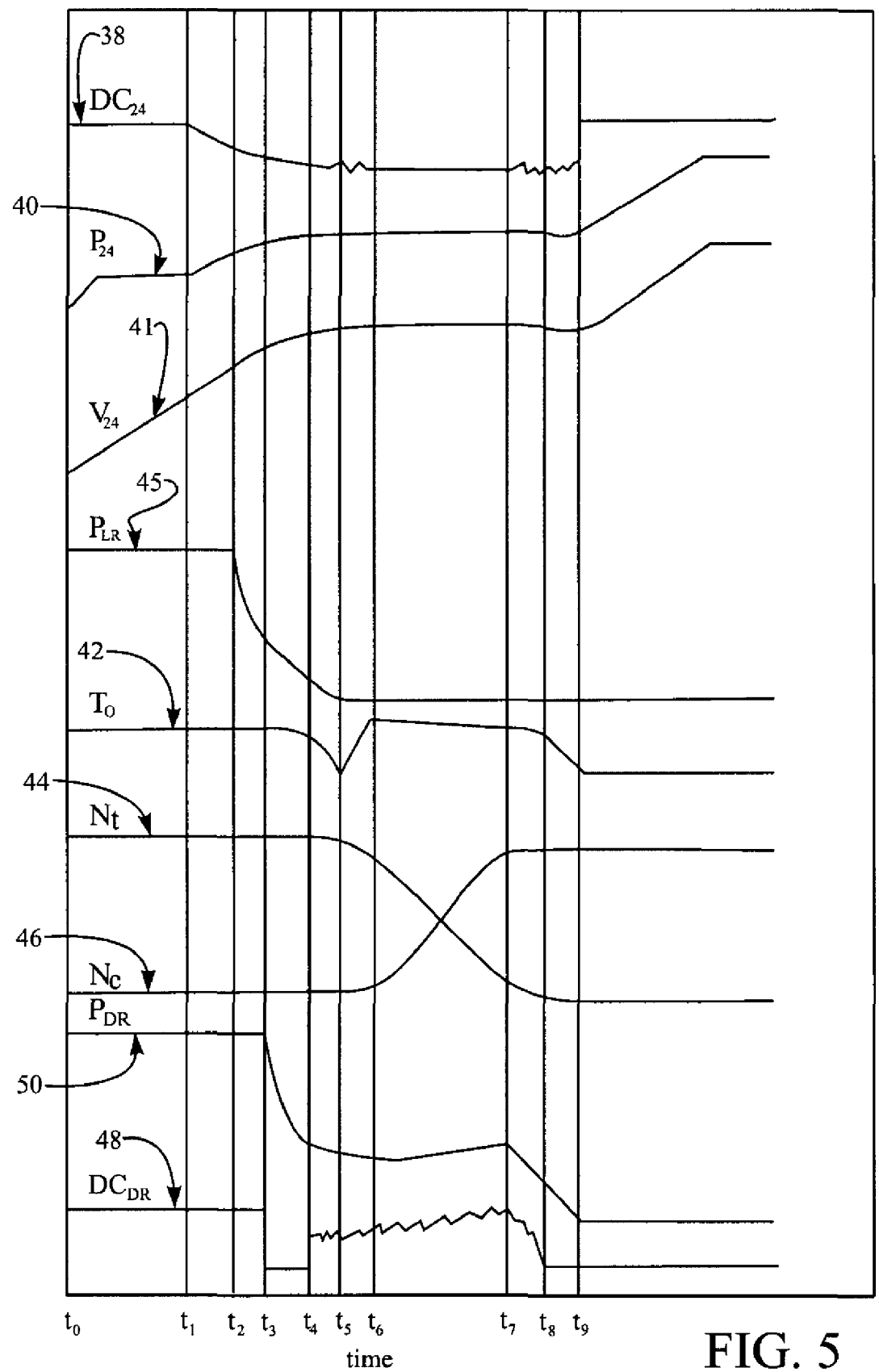
FIG. 5 is a graph of various parameters and components of the transmission and related components during execution of an upshift.

Turning now to one implementation of a double swap shift, some of the time based events and sequence of a $2^{nd}$ gear to $3^{rd}$ gear double swapshift are shown in FIG. 5. As shown in FIG. 2, prior to initiation of the shift, the UD and L-R clutches 18, 26 are applied in the main box 12 and the DR clutch 32 is applied in the compounder 14. As a result of the shift, the L-R and DR clutches 26, 32 are released and the 2-4 clutch 24 and freewheel clutch 34 are applied. By way of further illustration, the torque flow path of the transmission 10 in $2^{nd}$ gear is shown in FIG. 3, and the torque flow path of the transmission in $3^{rd}$ gear is shown in FIG. 4. In FIGS. 3 and 4, the applied clutches and active torque flow paths are shown in solid black, and released clutches are shown in lighter grey lines.

Referring now to FIG. 5, at to, the start of the upshift sequence, the 2-4 clutch solenoid 36 (FIG. 1) duty cycle is at 100%, as shown in line 38, for a fast fill and rapid increase in volume of the 2-4 clutch 24 as shown in line 41, and some pressure increase as shown in line 40. The fast fill may begin first because it usually takes more time to fill the clutch volume with the transmission fluid before the clutch develops any noticeable torque capacity than the time needed to completely vent a clutch to its zero torque capacity. The fast fill continues until the filled volume in the 2-4 clutch 24 reaches a learned fill volume that corresponds to a pressure just lower than the pressure where the 2-4 clutch overcomes the return spring force of the clutch piston (which is where the clutch initially has torque capacity), so just before the torque phase in the main box begins. At $t_1$, the torque phase of the upshift begins, the fast fill rate of the 2-4 clutch ends and control of the duty cycle of the 2-4 clutch solenoid 36 begins to provide a second, slower fill rate for a more gradual increase in the volume (and hence, pressure) of the 2-4 clutch. In this manner, the solenoid 36 duty cycle may be changed to gradually increase the 2-4 clutch volume to a learned target volume as a function of various parameters including, for example, engine torque, torque converter turbine speed, transmission output speed, and time. The input and output speeds may be measured by sensors 39, 41, respectively, and the compounder speed may be measured by another sensor 43 between the main box 12 and compounder 14. The solenoid duty cycle in this time interval can be selected from a table and/or a source of learned data.

Shortly thereafter, at $t_2$, venting of the release element (the L-R clutch 26) is initiated (as shown by the pressure curve shown in FIG. 5 at line 45) while the pressure of the 2-4 clutch 24 is increased as noted above. It should be noted that, depending on the venting rate or the L-R clutch volume, the venting may be initiated before $t_2$. In the example shown herein, the L-R clutch is not associated with an overrunning clutch. If an overrunning clutch is provided, this venting process may not be needed. Venting of the L-R clutch 26 may be started with a ballistic vent rate and may begin after the volume in the 2-4 clutch reaches some threshold level, or based on some other criteria, including as a function of the time required to engage the 2-4 clutch (i.e. the time required for the 2-4 clutch to reach required torque capacity to start the speed change phase of the upshift may be used and compared to the time needed to vent L-R clutch to determine when to initiate venting of the L-R clutch so it reaches zero torque capacity just before the 2-4 clutch has reached the required torque capacity to start the speed change phase). As shown by lines 44, 46, torque converter turbine speed and compounder speed may remain relatively constant to this time. At $t_3$, venting of the DR clutch 32 in the compounder 14 is initiated, as shown by the duty cycle change in line 48 and the pressure decrease in line 50. At $t_4$, a soft or slower release of the DR clutch 32 is initiated when the DR clutch 32 reaches a learned volume selected to permit slip in the compounder at a desired time. Accordingly, the DR clutch 32 is vented at a first rate which may be a fast or ballistic rate until a soft release start volume is reached and then venting continues at a second, lower rate until slippage occurs in the compounder as will be discussed. The volume at which the soft release is started is based at least in part on the turbine output torque and transmission output speed and may be a learned value that can be adjusted as a function of conditions sensed in prior shifts (for example, the time interval between the start point of the speed phase in the main box and the start point of the speed phase in the compounder compared to a desired time interval). The soft release is initiated by moderating the duty cycle of the DR clutch solenoid 54 (as shown in FIG. 1 and line 48) to slow the rate at which it is vented so that its volume is decreased to a level that corresponds with a pressure (as shown in line 50) just above the required torque capacity to prevent slip in the DR clutch. Turbine speed and compounder speed can remain relatively constant.

At $t_5$, and as shown in line 44, the torque converter turbine speed changes indicative of slip of the L-R clutch in the main box. In other words, the turbine speed is less than the compounder speed times the gear ratio in the main box which means the L-R clutch slips after the 2-4 clutch takes over all capacity. If the turbine speed is higher than the compounder speed times the gear ratio in the main box, the L-R clutch slips before the 2-4 clutch reaches its target volume (or required torque capacity). If that happens, the L-R clutch would momentarily be reapplied to hold the turbine speed, which is so-called "bump along", as set forth in U.S. Pat. No. 4,969,098. At this time the speed or inertia phase of the upshift in the main box begins and the torque phase ends. The duty cycle of the 2-4 clutch solenoid could be utilized to bring the turbine speed to a desired acceleration, and that could be accomplished at this point with feedback control. In some applications, though, the time until the next control phase (e.g. the time between $t_5$ and $t_6$) may be too short to effectively utilize feedback control.

As the turbine decelerates, the torque input to the compounder increases which triggers the DR clutch slip. If this slip occurs later than desired, the learned soft release start volume used to initiate the soft release of the DR clutch at $t_4$ can be decreased. If the slip occurs earlier than the speed phase begins at the main box, the learned soft release start volume at which the soft release is initiated can be increased. In this manner, the system can accommodate and adjust as various factors cause changes in transmission operation over time.

At $t_6$, the compounder speed begins to increase (as shown in line 46) as the DR clutch 32 slips, and this marks the beginning of the speed phase in the compounder. Hybrid feedback control of the DR clutch solenoid 54 duty cycle is initiated and a fixed apply element volume instead of the feedback control or a feed forward control method may be used in the main box when the compounder speed change is detected. Hybrid feedback control of the DR clutch solenoid 54 duty cycle may be accomplished as a function of feedback from sensors that detect engine torque, turbine speed, compounder speed and transmission output speed, as examples, to achieve a desire acceleration. As shown, the duty cycle of the DR clutch solenoid 54 may be increased to increase the fluid volume and pressure in the DR clutch 32 or decreased to decrease fluid volume and pressure in the DR clutch to control the compounder acceleration to a desired or determined rate. As is known in the art, slippage in the compounder may be detected as a function of the input and output speeds, and the gear ratio. If the input speed at the compounder 14 is equal to the compounder output speed times the gear ratio in the compounder 14, there is no slippage in the compounder. If the compounder input speed is greater than the compounder output speed times the gear ratio in the compounder, there is slippage in the compounder. If the rate of slippage speed increase is greater than a designed or desired slippage rate, the DR clutch pressure can be increased (by increasing the duty cycle of its solenoid to increase the fluid volume in the DR clutch). If the slippage rate is lower than the desired slippage rate, the DR clutch pressure can be decreased.

At $t_7$, as the compounder speed nears or is within a threshold value of its target speed (determined as a function of the selected gear into which the transmission is being shifted), feedback control of the 2-4 clutch solenoid 36 duty cycle is resumed and the DR clutch solenoid 54 duty cycle is changed to feed forward control (i.e. feedback control of the DR clutch solenoid 54 is stopped) so the compounder speed is controlled to its target speed for the selected gear at a learned or predetermined rate. This provides feedback control of the final application of the 2-4 clutch 24 to ensure the turbine speed is gently brought to its target speed for the selected gear and the main box goes to the proper gear ratio without any bumps.

At $t_8$, the overrunning clutch 34 in the compounder 14 takes the torque capacity and the compounder speed reaches its target speed. Preferably soon thereafter, the $2^{nd}$ gear to $3^{rd}$ gear upshift is finished and, at $t_9$, the turbine 17 reaches its target speed by way of feedback control of the 2-4 clutch as noted above and the 2-4 clutch is quickly ramped up to its line pressure.

In general terms and according to the implementation discussed above, the upshift is initiated first in the main box 12, and the speed phase in the compounder 14 begins after the speed phase in the main box 12. This permits the positive torque in the upshift speed phase to be canceled in whole or in part by the negative torque in the downshift speed phase to enable a smooth shift. In the implementation described, the soft release of the DR clutch facilitates maintaining control of the compounder after slip starts. Then, while performing open loop control in the main box 12 for the speed phase, the compounder downshift is controlled so that the compounder output speed nears its target speed. Soon after the compounder speed is sufficiently near its target speed, the turbine speed is controlled to its target speed and the shift sequence is finished. In at least one implementation it is preferred for a smoother shift to have the compounder 14 reach its target speed just before the turbine reaches its target speed, or at the same time.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. For example, while the term 'clutch' has been used throughout the description, that term may be interchangeable with the term 'friction element' or other corresponding structure. Accordingly, the invention should not be limited by a particular definition of the term 'clutch' or by any particular construction of a 'clutch' used by the assignee hereof or otherwise. The invention is defined by the following claims.

What is claimed is:

1. A method of controlling an upshift in a transmission having a main box and a compounder coupled to the main box and having at least one gearset and at least one clutch separate from the main box, the method comprising:
   initiating an upshift in the main box including application of at least one clutch in the main box;
   initiating venting of a clutch being released in the compounder during a torque phase;
   determining occurrence of slip in the compounder;
   controlling, after slip has occurred in the compounder, a duty cycle of a solenoid associated with the clutch being released in the compounder as a function of a desired acceleration of the compounder,
   determining a target input speed and a target compounder speed for the gear into which the transmission is being shifted;
   controlling a duty cycle of the solenoid of the clutch being applied when a speed of the compounder nears the target compounder speed to control the apply rate of the clutch being applied to bring an input speed to the target input speed;
   wherein the upshift is initiated by controlling the duty cycle of the solenoid associated with the clutch being applied providing a rapid increase in a fluid volume in the clutch that terminates when a target volume is reached;
   wherein the target volume gives rise to a pressure in the clutch being applied that is less than the pressure at which the clutch has capacity to take torque; controlling the duty cycle of the solenoid of the clutch being released when the compounder speed nears the compounder target speed to bring the compounder speed to the compounder target speed; and controlling the duty cycle of the solenoid of the clutch being applied when the compounder speed nears the compounder target speed is accomplished with feedback; and controlling the duty cycle of the solenoid of the clutch being released when the compounder speed nears the compounder target speed is accomplished with feed forward control.

2. The method of claim 1 wherein venting of the clutch being released in the compounder occurs at a first rate until a target fluid volume is reached in the clutch and thereafter occurs at a second rate.

3. The method of claim 2 wherein the second rate is lower than the first rate and the second rate is continued until slippage occurs in the compounder.

4. The method of claim 3 wherein if the time when slippage occurs in the compounder is different than a desired time during the shift, the target fluid volume at which the second rate of venting begins is changed so that the slippage in the compounder occurs at a desired time during a subsequent shift.

5. The method of claim 1 wherein the transmission comprises a six speed transmission.

6. The method of claim 1 wherein the compounder further comprises a freewheeling clutch.

7. A method of controlling an upshift in a transmission having a main box and a compounder coupled to the main box and having at least one gearset and at least one clutch separate from the main box, the method comprising:
   initiating an upshift in the main box including application of at least one clutch in the main box;

initiating venting of a clutch being released in the compounder during a torque phase;

determining occurrence of slip in the compounder;

controlling, after slip has occurred in the compounder, a duty cycle of a solenoid associated with the clutch being released in the compounder as a function of a desired acceleration of the compounder;

determining a target input speed and a target compounder speed for the gear into which the transmission is being shifted;

controlling the duty cycle of a solenoid of the clutch being applied when a compounder speed nears the compounder target speed to control an apply rate of the clutch being applied to bring an input to the target input speed;

wherein controlling the duty cycle of the solenoid associated with the clutch being released in the compounder after slip has occurred in the compounder is accomplished with feedback that controls the acceleration of the compounder; and wherein when the duty cycle of the solenoid associated with the clutch being released is subject to feedback control, the duty cycle of the solenoid associated with the clutch being applied is subject to open loop control.

8. The method of claim 7 wherein venting of the clutch being released in the compounder occurs at a first rate until a target fluid volume is reached in the clutch and thereafter occurs at a second rate.

9. The method of claim 8 wherein the second rate is lower than the first rate and the second rate is continued until slippage occurs in the compounder.

10. The method of claim 9 wherein if the time when slippage occurs in the compounder is different than a desired time during the shift, the target fluid volume at which the second rate of venting begins is changed so that the slippage in the compounder occurs at a desired time during a subsequent shift.

11. The method of claim 7 wherein the transmission comprises a six speed transmission.

12. The method of claim 7 wherein the compounder further comprises a freewheeling clutch.

13. A method of controlling a double swap upshift in a transmission having a main box and a compounder coupled to the main box, the method comprising:

initiating an upshift in the main box;

determining the end of an upshift torque phase in the main box;

initiating a downshift in the compounder near the end of the upshift torque phase in the main box so that a speed phase of the downshift in the compounder begins after a speed phase of the upshift begins in the main box;

determining a compounder target speed for the selected gear into which the transmission is being shifted;

controlling, after a compounder speed is within a threshold of the compounder target speed, a solenoid duty cycle associated with a clutch being applied to complete the upshift;

wherein controlling the duty cycle of the solenoid comprises releasing the clutch when a compounder speed nears the compounder target speed until the compounder speed is brought within the threshold of the compounder target speed; and wherein controlling the duty cycle of the solenoid of the clutch being applied when a compounder speed nears the compounder target speed is accomplished with feedback control, and controlling a duty cycle of the solenoid of the clutch being released when the compounder speed nears the compounder target speed is accomplished with feed forward control.

14. The method of claim 13 wherein the end of the upshift torque phase in the main box is determined by sensing slip in the main box.

15. The method of claim 13 wherein the upshift is initiated by controlling the duty cycle of a solenoid associated with the clutch being applied in the main box to increase the fluid volume in the clutch being applied.

16. The method of claim 15 wherein the fluid volume in the clutch being applied is increased at a first rate until a target volume is reached, and thereafter is increased at a second rate.

17. The method of claim 13 which also comprises, after a speed phase begins in the compounder, controlling the duty cycle of a solenoid associated with a clutch being released during the downshift to provide a predetermined acceleration of the compounder.

18. The method of claim 13 wherein the initiating the downshift includes venting a clutch to be released in the compounder at a first rate until a target volume is reached and venting the same clutch at a second rate after the target volume is reached and until a speed phase begins in the compounder.

* * * * *